US010237799B2

United States Patent
Yang et al.

(10) Patent No.: US 10,237,799 B2
(45) Date of Patent: Mar. 19, 2019

(54) INFORMATION TRANSMISSION METHOD, WIRELESS NETWORK CONTROL APPARATUS, AND NETWORK ACCESS POINT

(71) Applicant: Huawei Technologies Co., Ltd., Shenzhen (CN)

(72) Inventors: Xun Yang, Beijing (CN); Rui Ni, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/414,874

(22) Filed: Jan. 25, 2017

(65) Prior Publication Data

US 2017/0135015 A1    May 11, 2017

Related U.S. Application Data

(63) Continuation of application No. PCT/CN2014/083530, filed on Aug. 1, 2014.

(51) Int. Cl.
*H04W 36/18* (2009.01)
*H04W 48/18* (2009.01)
(Continued)

(52) U.S. Cl.
CPC ........ *H04W 36/18* (2013.01); *H04W 36/0083* (2013.01); *H04W 48/18* (2013.01);
(Continued)

(58) Field of Classification Search
CPC ..... H04W 36/18; H04W 48/18; H04W 88/02; H04W 84/12; H04W 88/08; H04W 36/0083
(Continued)

(56) References Cited

U.S. PATENT DOCUMENTS

| | | | |
|---|---|---|---|
| 2008/0025329 A1 | 1/2008 | Livet et al. | |
| 2010/0110993 A1 | 5/2010 | Jain et al. | |
| 2010/0296499 A1* | 11/2010 | Karaoguz | H04L 12/4625 370/338 |

FOREIGN PATENT DOCUMENTS

| | | | |
|---|---|---|---|
| CN | 101395856 A | 3/2009 | |
| CN | 101496361 A | 7/2009 | |

(Continued)

OTHER PUBLICATIONS

"Requirements for WLAN/3GPP Radio Interworking," Agenda Item: 5.1, Source: ETRI, Document for: Discussion and Decision, R2-130331, 3GPP TSG-RAN WG2 #81, St. Julian's, Malta, Jan. 28-Feb. 1, 2013, 2 pages.

(Continued)

*Primary Examiner* — Nay A Maung
*Assistant Examiner* — Angelica M Perez
(74) *Attorney, Agent, or Firm* — Slater Matsil, LLP

(57) ABSTRACT

A wireless network control apparatus including a receiver configured to obtain a network information of a first-standard network, a processor configured to determine an instruction information which includes the network information that is of the first-standard network and that is obtained by the receiver, and a transmitter, configured to send the instruction information determined by the processor to a second-standard network, so that the second-standard network sends the network information of the first-standard network to a terminal, where the terminal works in the second-standard network.

12 Claims, 9 Drawing Sheets

(51) Int. Cl.
*H04W 36/00* (2009.01)
*H04W 84/12* (2009.01)
*H04W 88/02* (2009.01)
*H04W 88/08* (2009.01)

(52) U.S. Cl.
CPC ............ *H04W 84/12* (2013.01); *H04W 88/02* (2013.01); *H04W 88/08* (2013.01)

(58) Field of Classification Search
USPC ...................................................... 455/552.1
See application file for complete search history.

(56) References Cited

FOREIGN PATENT DOCUMENTS

| CN | 101801055 A | 8/2010 | |
|---|---|---|---|
| CN | 101883312 A | 11/2010 | |
| CN | 102440045 A | 5/2012 | |
| CN | 103179641 A | 6/2013 | |
| WO | 2009132122 A2 | 10/2009 | |
| WO | WO 2010127597 A1 * | 11/2010 | ........ H04W 36/0066 |

OTHER PUBLICATIONS

"Air-Interface Enhancement Proposals for WLAN/3GPP Radio Interworking," Agenda Item: 5.1, Source: Broadcom Corporation, Document for: Discussion and Approval, R2-131384, 3GPP TSG-RAN WG2 Meeting #81-BIS, Chicago, Apr. 15-19, 2013, 8 pages.
"Assistance Information for Network Selection," Agenda Item: 5.1.1, Source: MediaTek, Document for: Discussion and Decision, R2-131863, 3GPP TSG RAN WG2 #82, Fukuoka, Japan, May 20-24, 2013, 4 pages.
"Additional use Cases Involving WLAN," Agenda Item: 17.2, Source: Kyocera Corp., Document for: Approval, R3-141293, 3GPP TSG RAN WG3 Meeting #84, Seoul, Republic of Korea, May 19-23, 2014, 4 pages.

* cited by examiner

INFORMATION TRANSMISSION METHOD, WIRELESS NETWORK CONTROL APPARATUS, AND NETWORK ACCESS POINT

CROSS-REFERENCE TO RELATED APPLICATIONS

This application is a continuation of International Application No. PCT/CN2014/083530, filed on Aug. 1, 2014, the disclosure of which is hereby incorporated by reference in its entirety.

TECHNICAL FIELD

Embodiments of the present invention relate to the field of wireless communications technologies, and more specifically, to an information transmission method, a wireless network control apparatus, and a network access point.

BACKGROUND

With rapid development of wireless communications technologies and popularity of intelligent user terminals, an increasing number of user terminals can support a heterogeneous network. The heterogeneous network includes access networks of different standards. Communications standards may include a wireless cellular network, a wireless local area network (WLAN), a worldwide interoperability for microwave access (WiMAX) network, Bluetooth, infrared, and the like. User experience consistency can be improved by integrating access technologies of networks of multiple communications standards.

Currently, an integration solution to networks of multiple communications standards that is provided in the 3rd Generation Partnership Project (3GPP) is integration based on an Internet Protocol (IP) layer. In this integration solution, networks of multiple communications standards such as a cellular network and a WLAN network can be authorized and authenticated together. The cellular network can assist implementation of WLAN network discovery, and the WLAN network can implement offloading of some data in the cellular network.

However, in the foregoing solution, spectrum resources of networks of different communications standards cannot be comprehensively used. When a terminal has not accessed a network of a particular standard, or when a network of a particular standard has heavy load when sending network information of the network to a terminal, cooperation in terms of sending network information cannot be effectively implemented by using a network of another standard.

SUMMARY

Embodiments of the present invention provide an information transmission method, a wireless network control apparatus, and a network access point, so that cooperation between networks of multiple standards in terms of sending network information can be implemented.

According to a first aspect, a wireless network control apparatus is provided, where the wireless network control apparatus includes an obtaining module, configured to obtain network information of a first-standard network, a determining module, configured to determine instruction information, where the instruction information includes the network information that is of the first-standard network and that is obtained by the obtaining module, and a sending module configured to send the instruction information determined by the determining module to a second-standard network, so that the second-standard network sends the network information of the first-standard network to a terminal, where the terminal works in the second-standard network.

With reference to the first aspect, in a first possible implementation manner of the first aspect, the instruction information is used to instruct the second-standard network to broadcast the network information of the first-standard network to the terminal. The sending module is further configured to send another piece of instruction information to the first-standard network, where the another piece of instruction information is used to instruct an access point in the first-standard network to stop broadcasting the network information of the first-standard network, or is used to instruct an access point in the first-standard network to broadcast the network information of the first-standard network by using a short management frame.

With reference to the first aspect or the first possible implementation manner of the first aspect, in a second possible implementation manner of the first aspect, the first-standard network is a wireless local area network WLAN, and the second-standard network is a cellular network.

With reference to the first aspect, in a third possible implementation manner of the first aspect, the network information of the first-standard network includes information about an access point in the first-standard network. The apparatus further includes a receiving module, configured to, before the obtaining module obtains the network information of the first-standard network, receive request information that is sent by the second-standard network and that is used by the terminal to request to access the first-standard network, and the determining module is configured to determine, according to the network information of the first-standard network and the request information, the instruction information including information about an access point, accessible to the terminal, in the first-standard network.

With reference to the third possible implementation manner of the first aspect, in a fourth possible implementation manner of the first aspect, the request information further includes an identifier used to indicate a first location of the terminal. The determining module is configured to determine the first location of the terminal according to the identifier, determine a second location of the access point in the first-standard network, and determine, according to the first location, the second location, the network information of the first-standard network, and the request information, the instruction information including the information about the access point, accessible to the terminal, in the first-standard network.

With reference to the first aspect, in a fifth possible implementation manner of the first aspect, the network information of the first-standard network includes information about an access point in the first-standard network, and the obtaining module is further configured to obtain network information of the second-standard network before the instruction information is determined. The determining module is configured to determine, according to the network information of the first-standard network and the network information of the second-standard network, the instruction information including the information about the access point in the first-standard network, where the access point in the first-standard network is an access point that is in the first-standard network to which the terminal can be handed over from the second-standard network.

With reference to any one of the first aspect, or the first to the fifth possible implementation manners of the first aspect, in a sixth possible implementation manner of the first aspect, the network information includes at least one type of the following: information about a currently used channel, transmit power information, access point information, user quantity information, load status information, congestion degree information, and quality of service QoS information of different types of services.

According to a second aspect, a network access point is provided, where the network access point belongs to a second-standard network. The network access point includes a receiving module configured to receive instruction information determined by a wireless network control apparatus, where the instruction information includes network information of a first-standard network, and a sending module configured to send, to a terminal, the network information that is of the first-standard network and that is received by the receiving module, where the terminal works in the second-standard network.

With reference to the second aspect, in a first possible implementation manner of the second aspect, the first-standard network is a wireless local area network WLAN, the second-standard network is a cellular network, and the instruction information includes information used to instruct the second-standard network to broadcast the network information of the first-standard network to the terminal. The sending module is configured to broadcast network information of the WLAN to the terminal.

With reference to the second possible implementation manner of the second aspect, in a third possible implementation manner of the second aspect, the receiving module is further configured to receive request information that is sent by the terminal to request to access the first-standard network. The sending module is further configured to send the request information to the wireless network control apparatus, so that the wireless network control apparatus determines, according to the network information of the first-standard network and the request information, the instruction information including information about an access point, accessible to the terminal, in the first-standard network.

According to a third aspect, an information transmission method is provided, where the method is performed by a wireless network control apparatus. The method includes obtaining network information of a first-standard network, determining instruction information, where the instruction information includes the network information of the first-standard network, and sending the instruction information to a second-standard network, so that the second-standard network sends the network information of the first-standard network to a terminal, where the terminal works in the second-standard network.

With reference to the third aspect, in a first possible implementation manner of the third aspect, the instruction information is used to instruct the second-standard network to broadcast the network information of the first-standard network to the terminal. The method further includes sending another piece of instruction information to the first-standard network, where the another piece of instruction information is used to instruct an access point in the first-standard network to stop broadcasting the network information of the first-standard network, or is used to instruct an access point in the first-standard network to broadcast the network information of the first-standard network by using a short management frame.

With reference to the third aspect or the first possible implementation manner of the third aspect, in a second possible implementation manner of the third aspect, the first-standard network is a wireless local area network WLAN, and the second-standard network is a cellular network.

With reference to the third aspect, in a third possible implementation manner of the third aspect, the network information of the first-standard network includes information about an access point in the first-standard network, and before the obtaining network information of a first-standard network, the method further includes receiving request information that is sent by the second-standard network and that is used by the terminal to request to access the first-standard network. The determining instruction information includes determining, according to the network information of the first-standard network and the request information, the instruction information including information about an access point, accessible to the terminal, in the first-standard network.

With reference to the third possible implementation manner of the third aspect, in a fourth possible implementation manner of the third aspect, the request information further includes an identifier used to indicate a first location of the terminal. The determining, according to the network information of the first-standard network and the request information, the instruction information including information about an access point, accessible to the terminal, in the first-standard network includes determining the first location of the terminal according to the identifier, determining a second location of the access point in the first-standard network, and determining, according to the first location, the second location, the network information of the first-standard network, and the request information, the instruction information including the information about the access point, accessible to the terminal, in the first-standard network.

With reference to the third aspect, in a fifth possible implementation manner of the third aspect, the network information of the first-standard network includes information about an access point in the first-standard network. Before the determining instruction information, the method further includes obtaining network information of the second-standard network. The determining instruction information includes determining, according to the network information of the first-standard network and the network information of the second-standard network, the instruction information including the information about the access point in the first-standard network, where the access point in the first-standard network is an access point that is in the first-standard network to which the terminal can be handed over from the second-standard network.

With reference to any one of the third aspect, or the first to the fifth possible implementation manners of the third aspect, in a sixth possible implementation manner of the third aspect, the network information includes at least one type of the following: information about a currently used channel, transmit power information, access point information, user quantity information, load status information, congestion degree information, and quality of service QoS information of different types of services.

According to a fourth aspect, an information transmission method is provided, where the method is performed by a second-standard network. The method includes receiving instruction information determined by a wireless network control apparatus, where the instruction information includes network information of a first-standard network, and sending the network information of the first-standard network to a terminal, where the terminal works in the second-standard network.

With reference to the fourth aspect, in a first possible implementation manner of the fourth aspect, the first-standard network is a wireless local area network WLAN, the second-standard network is a cellular network, and the instruction information includes information used to instruct the second-standard network to broadcast the network information of the first-standard network to the terminal. The sending the network information of the first-standard network to a terminal includes broadcasting network information of the WLAN to the terminal.

With reference to the second possible implementation manner of the fourth aspect, in a third possible implementation manner of the fourth aspect, the method further includes receiving request information that is sent by the terminal to request to access the first-standard network, and sending the request information to the wireless network control apparatus, so that the wireless network control apparatus determines, according to the network information of the first-standard network and the request information, the instruction information including information about an access point, accessible to the terminal, in the first-standard network.

Based on the foregoing technical solutions, in the information transmission method, the wireless network control apparatus, and the network access point that are provided in the embodiments of the present invention, network information of a first-standard network is obtained and the network information of the first-standard network is sent to a terminal by using a second-standard network, so that spectrum resources of networks of multiple standards can be comprehensively used, and cooperation between the networks of multiple standards in terms of sending network information can be implemented.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
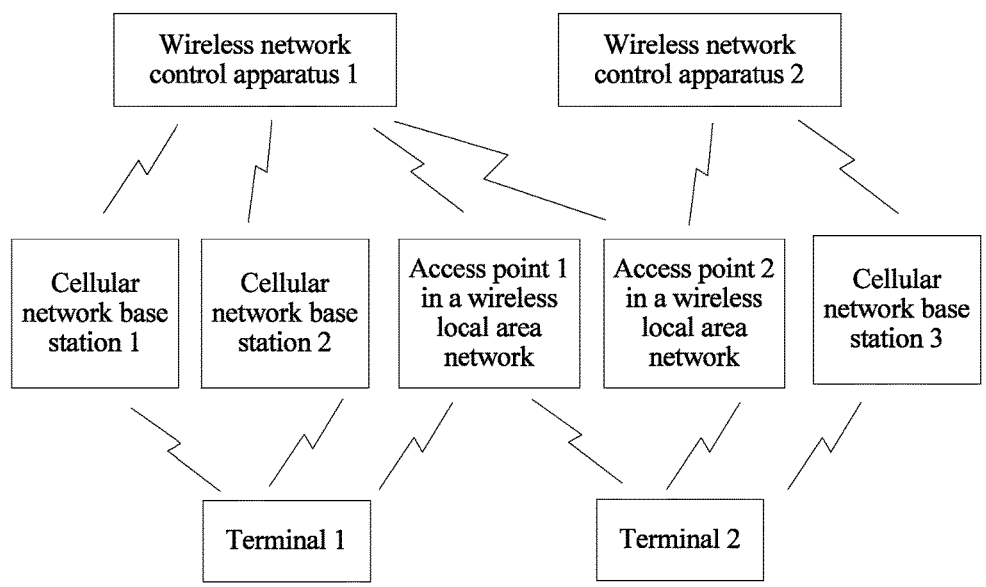
FIG. 1 is a schematic diagram of a heterogeneous network.

The following clearly describes the technical solutions in embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Implementation manners of the present invention are applicable to a scenario in which a terminal supports networks of multiple communications standards. The multiple communications standards include but are not limited to Global System for Mobile communication (GSM) or Code Division Multiple Access (CDMA), or may be Wideband Code Division Multiple Access (WCDMA), or may be Long Term Evolution (LTE), a future 5G network standard, or another communications standard such as a Wireless Local Area Network (WLAN), Worldwide Interoperability for Microwave Access (WiMAX), Bluetooth, or infrared.

A terminal may also be referred to as a system, a subscriber unit, a subscriber station, a mobile station, a remote station, a remote terminal, a mobile device, a user terminal, a terminal, a wireless communications device, a user agent, a user apparatus, or User Equipment (UE). The terminal may be a cellular phone, a cordless phone, a Session Initiation Protocol (SIP) phone, a Wireless Local Loop (WLL) station, a Personal Digital Assistant (PDA), a handheld device, an in-vehicle device, or a computing device with a wireless communication function, or another processing device connected to a wireless modem.

The following briefly introduces a current integration architecture of a heterogeneous network including networks of multiple communications standards. The current communications network integration architecture includes two parts: a Core Network (CN) and a Radio Access Network (RAN). In the core network, specifically, network elements such as Gateway GPRS Support Node (GGSN)/a Packet Gateway (PGW), a Serving GPRS Support Node (SGSN), and a Serving Gateway (SGW) constitute a control plane and a user plane; auxiliary network elements such as a Home Subscriber Server (HSS), a Policy and Charging Rules Function (PCRF) unit, an Authentication Authorization Accounting Server (AAA Server), an Access Network Discovery and Selection Function (ANDSF) unit constitute a user information database.

The access network may include a wireless cellular network including a Base Station Controller (BSC)/a Radio Network Controller (RNC), a Base Transceiver Station (BTS)/a NodeB (NodeB)/an evolved NodeB (eNodeB), and the like, or may include a wireless cellular network including a micro base station, a pico base station, a home eNodeB that may also be called a femtocell (femto), or the like, or may include a WLAN including a WLAN Access Point (AP), which is not limited in embodiments of the present invention.

FIG. 1 is a schematic diagram of a heterogeneous network applied to an embodiment of the present invention. In the heterogeneous network, a terminal with functions of multiple standards may communicate with access points in networks of different standards. The access points in the network of different standards may physically exist on one device or multiple different devices, and may communicate with one or more wireless network control apparatuses. The wireless network control apparatus may be a function unit or a function module, and may be deployed on access points or terminals in networks of multiple standards, or may be deployed on a physical device at a higher level. Alternatively, the wireless network control apparatus may be an independent physical device.

In an example of FIG. 1, networks of multiple standards include a wireless cellular network and a WLAN. A terminal may communicate with one or more base stations in the wireless cellular network and one or more APs in the WLAN. The one or more base stations in the wireless cellular network and the one or more APs in the WLAN may communicate with a wireless network control apparatus. FIG. 1 schematically shows three base stations in the wireless cellular network and two APs in the WLAN. These base stations and APs may separately communicate with corresponding wireless network control apparatuses. Quantities of base stations, APs, terminals, and wireless network control apparatuses in FIG. 1 are only exemplary, and shall not constitute any limitation on embodiments of the present invention.

Figure 2:
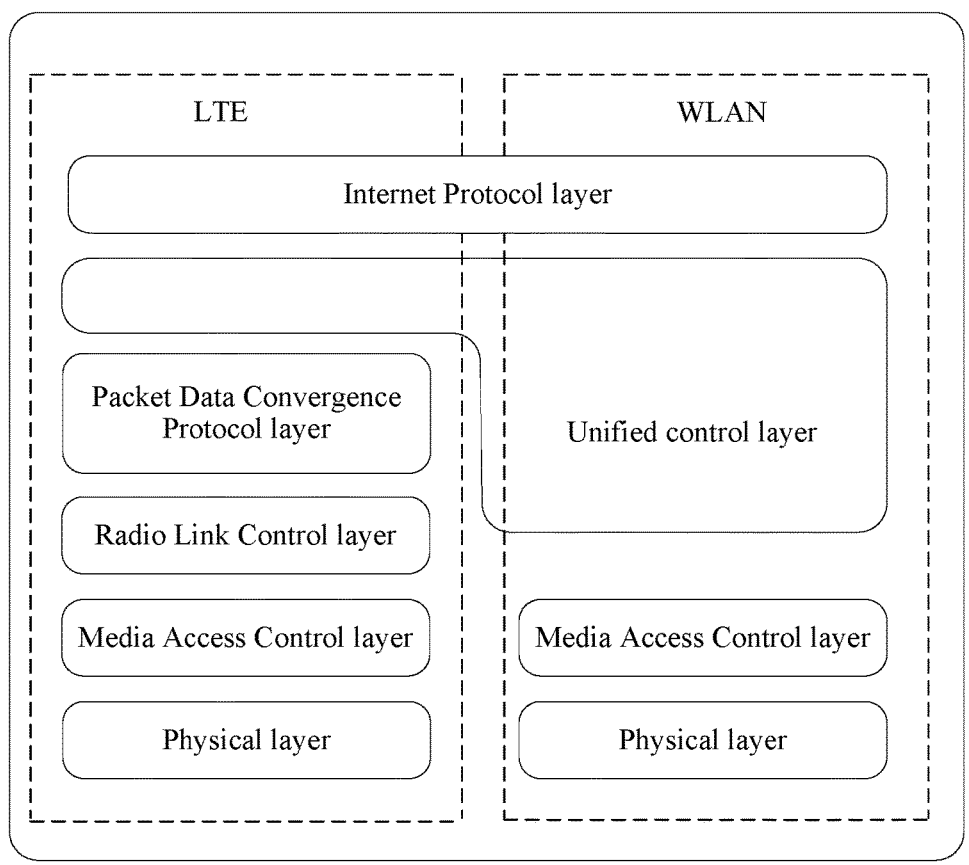
FIG. 2 is a schematic diagram of a protocol stack of a heterogeneous network.

FIG. 2 is a schematic diagram of a protocol stack of a heterogeneous network applied to an embodiment of the present invention. In an example of FIG. 2, networks of multiple standards include an LTE access network in a wireless cellular network and a WLAN. The left side is a protocol stack of the LTE access network, and the right side is a protocol stack of the WLAN. In the LTE access network, a resource reservation policy is used in a licensed spectrum, and better Quality of Service (QoS) is ensured, but the LTE access network is rent at a higher price. In the WLAN, a sharing and competition policy is used in an unlicensed spectrum, fine QoS assurance cannot be provided, but a price is low. Therefore, a unified control layer is added above a Packet Data Convergence Protocol (PDCP) layer of the LTE access network and a Media Access Control (MAC) layer of the WLAN. At the unified control layer, network information may be obtained from access points in networks (the LTE access network and the WLAN) of different communications standards, and then a comprehensive decision is made according to the network information of the networks of different communications standards. That is, a wireless network control apparatus may separately communicate with the PDCP layer of the LTE access network and the MAC layer of the WLAN by using the unified control layer. Access networks of different communications standards are controlled together, so that the licensed spectrum and the unlicensed spectrum can be used together.

Figure 3:
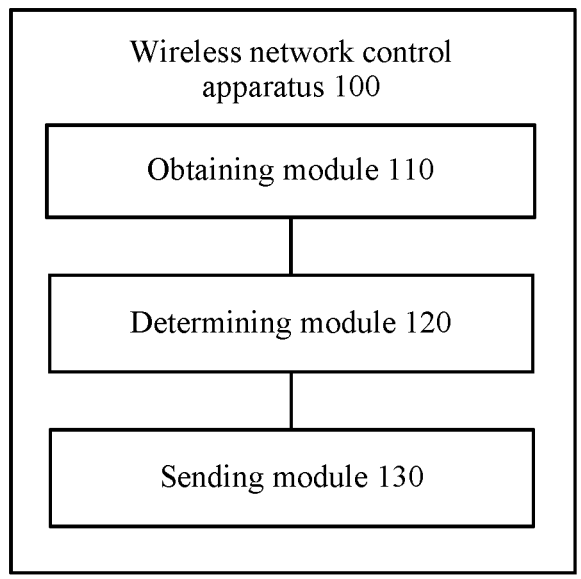
FIG. 3 is a schematic block diagram of a wireless network control apparatus according to an embodiment of the present invention.

FIG. 3 shows a schematic block diagram of a wireless network control apparatus 100 according to an embodiment of the present invention. The wireless network control apparatus 100 may be an independent device, or may be a function unit. As shown in FIG. 3, the wireless network control apparatus 100 includes an obtaining module no, a determining module 120, and a sending module 130.

The obtaining module no is configured to obtain network information of a first-standard network. The obtaining module no may obtain network information of networks of multiple standards. For example, the obtaining module no sends a request for collecting network information to access points in networks of different standards, to require the networks of different standards to report network information of the networks of different standards; or access points in networks of different standards periodically report network information to the obtaining module no according to presetting, which is not limited in this embodiment of the present invention. The network information may be sent to the obtaining module no by using an access point in a network, or may be sent to the obtaining module 110 by using another access device or control device in a network, which is not limited in this embodiment of the present invention.

It should be understood that the network information obtained by the obtaining module no may include at least one type of the following information of the networks of different standards: information about a currently used channel, transmit power information, access point information, user quantity information, load status information, congestion degree information, and quality of service QoS information of different types of services, which is not limited in this embodiment of the present invention.

The determining module 120 is configured to determine instruction information, where the instruction information includes the network information that is of the first-standard network and that is obtained by the obtaining module 110.

Specifically, after the obtaining module 110 obtains the network information of the first-standard network, the determining module 120 may make a comprehensive decision according to network statuses and terminal statuses that are of the current networks of different standards and that are obtained by the obtaining module no, and determine the instruction information for a second-standard network. The instruction information is used to instruct the second-standard network to perform processing related to the first-standard network, and includes the network information of the first-standard network. That is, the determining module 120 makes a decision related to the first-standard network, and the second-standard network assists in delivering related information of the first-standard network in the decision to the terminal. Making the comprehensive decision means that the decision is a decision made by taking network statuses of the first-standard network and the second-standard network into consideration and with reference to statuses of multiple terminals in the networks of the two standards. In a specific example, currently, there are two access points in the cellular network and three access points in the WLAN, and four terminals access the access points in the foregoing cellular network and five terminals access the access points in the foregoing WLAN. The obtaining module no obtains network information of the cellular network and the WLAN, and the determining module 120 makes a comprehensive decision with reference to statuses of the current several terminals. For example, the decision may be as follows: Two of the four terminals that access the cellular network are handed over to the WLAN, and access the WLAN by using an access point in the WLAN.

It should be noted that a relationship between an access point in the first-standard network and an access point in the second-standard network may be obtained according to heterogeneous information. For example, the heterogeneous information may include information indicating an access point in the first-standard network and an access point in the second-standard network that constitute a heterogeneous access network, and the like. The heterogeneous information may be stored in the wireless network control apparatus, or may be stored in a third-party network element that can be obtained by using the wireless network control apparatus, which is not limited in this embodiment of the present invention. In addition, this embodiment of the present invention may further be similarly applied to two or more networks of a same standard. For example, this embodiment of the present invention may further be applied to two different networks of a cellular network.

The sending module 130 is configured to send the instruction information determined by the determining module 120 to the second-standard network, so that the second-standard network sends the network information of the first-standard network to a terminal, where the terminal works in the second-standard network.

After the determining module 120 makes the decision related to the first-standard network, the sending module 130 sends the decision to the second-standard network, and the second-standard network notifies the terminal, so that the terminal performs related processing. For example, the terminal selects a proper access point to access a network, or to perform network handover, or the like.

It should be understood that the terminal in this embodiment of the present invention currently works at least in the second-standard network, so that information about the access point in the first-standard network may be sent by using the access point in the second-standard network. That is, if the terminal currently works only in the second-standard network, information may be sent to the terminal by using a resource corresponding to the second-standard network; if the terminal currently works in multiple networks such as a cellular network, a WLAN, and Bluetooth, instruction information that is related to the WLAN and that is determined by the determining module 120 may be sent to the terminal by using the cellular network or the Bluetooth, so that load of the WLAN may be relieved.

Therefore, the wireless network control apparatus provided in this embodiment of the present invention obtains network information of a first-standard network, and sends the network information of the first-standard network to a terminal by using a second-standard network, so that spectrum resources of networks of multiple standards can be comprehensively used, and cooperation between the networks of multiple standards in terms of sending network information can be implemented.

Optionally, in an embodiment, the instruction information is used to instruct the second-standard network to broadcast the network information of the first-standard network to the terminal. The sending module 130 is further configured to send another piece of instruction information to the first-standard network, where the another piece of instruction information is used to instruct an access point in the first-standard network to stop broadcasting the network information of the first-standard network, or is used to instruct an access point in the first-standard network to broadcast the network information of the first-standard network by using a short management frame.

Specifically, the access point in the first-standard network always needs to periodically or aperiodically broadcast the network information of the first-standard network to the terminal; therefore, load of a MAC layer of the first-standard network is heavy. The network information that is of the first-standard network and that is obtained by the obtaining module no of the wireless network control apparatus 100 is information about a currently used channel, transmit power information, access point information, user quantity information, load status information, congestion degree information, quality of service QoS information of different types of services, or the like. These pieces of information of the first-standard network are sent to a corresponding terminal in a broadcasting or unicasting manner by using the second-standard network, so that the first-standard network sends the network information less frequently, efficiency of the MAC layer of the first-standard network can be improved, and resources of networks of multiple standards supported by the terminal can be more fully used.

For example, the first-standard network is a WLAN, and the second-standard network is a cellular network. The cellular network broadcasts, to the terminal according to the instruction information sent by the sending module 130 of the wireless network control apparatus 100, network information of the WLAN with which the cellular network constitutes a heterogeneous network. In addition, the sending module 130 sends another piece of instruction information to the WLAN. The another piece of instruction information is used to instruct an access point in the WLAN to stop broadcasting the network information of the WLAN, or is used to instruct an access point in the WLAN to broadcast the network information of the WLAN by using a short management frame. In the WLAN, a beacon frame beacon is generally used for broadcasting. In this embodiment of the present invention, the network information of the WLAN is broadcasted or unicasted by using the cellular network; therefore, broadcasting a beacon in the WLAN may be cancelled or a beacon may be broadcasted less frequently; or a common beacon is changed into a short beacon during broadcasting.

Therefore, in the wireless network control apparatus provided in this embodiment of the present invention, in a heterogeneous network in which WLANs are densely deployed, a cellular network is controlled to broadcast or unicast network information of the WLAN, so that fewer beacons in the WLAN can be sent, and efficiency of a MAC layer of the WLAN can be improved.

Optionally, in another embodiment, the network information of the first-standard network includes information about an access point in the first-standard network, and the wireless network control apparatus 100 further includes a receiving module, configured to: before the obtaining module 110 obtains the network information of the first-standard network, receive request information that is sent by the second-standard network and that is used by the terminal to request to access the first-standard network. The determining module 120 is configured to determine, according to the network information of the first-standard network and the request information, the instruction information including information about an access point, accessible to the terminal, in the first-standard network.

Specifically, the terminal that supports multiple standards preliminarily determines a network status according to a current running status of the terminal such as a type of a currently processed service, QoS requirements of services of different types, or a network speed of a current communications standard. For example, if the terminal is currently in the second-standard network, and the terminal determines that the terminal needs to access the first-standard network, the terminal sends, to the receiving module of the wireless network control apparatus 100 by using the second-standard network, request information used to request to access the first-standard network.

The obtaining module no obtains the network information of the first-standard network, and the determining module 120 makes a comprehensive decision according to the request information that is sent by the second-standard network and that is used by the terminal to request to access the first-standard network, and determines that the terminal accesses an access point in the first-standard network. The wireless network control apparatus 100 adds an identifier of the terminal and the information used to indicate the access point, accessible to the terminal, in the first-standard network into the instruction information, and sends the instruction information to the second-standard network by using the sending module 130. The access point in the second-standard network sends, to the terminal, the information that indicates the access point, accessible to the terminal, in the first-standard network. The information that indicates the access point, accessible to the terminal, in the first-standard network may be a list of access points in the first-standard network that are accessible to the terminal, which is not limited in this embodiment of the present invention.

Optionally, the request information may further include an identifier used to indicate a first location of the terminal. The determining module 120 is configured to determine the first location of the terminal according to the identifier, determine a second location of the access point in the first-standard network, and determine, according to the first location, the second location, the network information of the first-standard network, and the request information, the instruction information including the information about the access point, accessible to the terminal, in the first-standard network.

Specifically, the determining module 120 may further determine the access point, accessible to the terminal, in the first-standard network with reference to locations of the terminal and the access point in the first-standard network. For example, an access point that is in the first-standard network and whose distance from the terminal is within a threshold range may be determined as the access point that is in the instruction information, is in the first-standard network, and is accessible to the terminal. The locations of the terminal and the access point in the first-standard network are taken into consideration, so that a decision that is made by the wireless network control apparatus and related to the access point, accessible to the terminal, in the first-standard network is more accurate.

The determining module 120 may determine the first location of the terminal according to the identifier included in the request information. The determining module 120 may determine the second location of the access point in the first-standard network by using a GPS (Global Positioning System) or by using a technical means such as indoor positioning, which is not limited in this embodiment of the present invention. In addition, location information of the access point in the first-standard network may be determined not by the determining module 120 but by another positioning device, and after positioning, the access point or the positioning device reports the location information of the access point to the wireless network control apparatus 100.

Therefore, when load on a network of a particular standard is heavy, a terminal requests to access or be handed over to a network of another standard, and the wireless network control apparatus provided in this embodiment of the present invention instructs to communicate with the terminal by using the currently working network, and sends network information of the network of another standard, so that spectrum resources of networks of multiple standards can be comprehensively used, and cooperation between the networks of multiple standards in terms of sending network information can be implemented.

Optionally, in another embodiment, access to the first-standard network by the terminal is not determined and initiated by the terminal, but is actively initiated by the wireless network control apparatus 100. Correspondingly, the network information of the first-standard network includes information about an access point in the first-standard network. The obtaining module no is further configured to obtain network information of the second-standard network before the instruction information is determined. The determining module 120 is configured to determine, according to the network information of the first-standard network and the network information of the second-standard network, the instruction information including the information about the access point in the first-standard network, where the access point in the first-standard network is an access point that is in the first-standard network to which the terminal can be handed over from the second-standard network.

Specifically, the obtaining module no obtains the respective network information of the first-standard network and the second-standard network, especially respective load statuses, user quantities, QoS of different types of users, and the like of the first-standard network and the second-standard network, and certainly, the information about the access point in the first-standard network is included. The determining module 120 determines, according to the respective network information of the first-standard network and the second-standard network, a terminal in the second-standard network that is to be handed over to the first-standard network. The sending module 130 sends, to the second-standard network, the instruction information including the information about the access point that is in the first-standard network to which the terminal may be handed over from the second-standard network, and sends the information about the access point in the first-standard network to the corresponding terminal by using the second-standard network.

Optionally, the instruction information may further include handover time information, to instruct to hand over the terminal to the first-standard network before a specified time, and the second-standard network also sends the handover time information to the terminal.

Therefore, when load on a network of a particular standard is heavy, the wireless network control apparatus provided in this embodiment of the present invention hands over a terminal to a network of another standard, instructs to communicate with the terminal by using the currently working network, and sends network information of the network of another standard, so that spectrum resources of networks of multiple standards can be comprehensively used, and cooperation between the network of multiple standards in terms of sending network information can be implemented.

It should be understood that, in this embodiment of the present invention, the wireless network control apparatus 100 according to this embodiment of the present invention may be corresponding to an entity for performing a method according to an embodiment of the present invention that is described in the following, and the foregoing and other operations and/or functions of the modules in the wireless network control apparatus 100 are respectively used to implement corresponding procedures of methods in FIG. 7 to FIG. 11. For brevity, details are not described herein.

Figure 4:
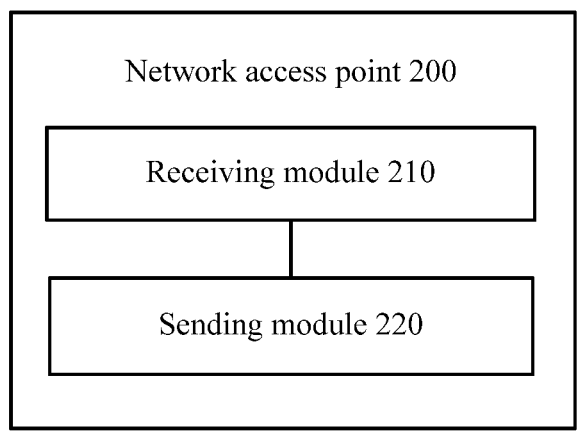
FIG. 4 is a schematic block diagram of a network access point according to an embodiment of the present invention.

FIG. 4 shows a schematic block diagram of a network access point 200 according to an embodiment of the present invention, where the network access point 200 belongs to a second-standard network. As shown in FIG. 4, the network access point 200 includes a receiving module 210, configured to receive instruction information determined by a wireless network control apparatus, where the instruction information includes network information of a first-standard network, and a sending module 220, configured to send, to a terminal, the network information that is of the first-standard network and that is received by the receiving module 210, where the terminal works in the second-standard network.

Therefore, the network access point provided in this embodiment of the present invention receives network information that is of a first-standard network and that is sent by a wireless network control apparatus, and may replace the first-standard network to send the network information of the first-standard network to a terminal, so that spectrum resources of networks of multiple standards can be comprehensively used, and cooperation between the networks of multiple standards in terms of sending network information can be implemented.

Optionally, in an embodiment, the first-standard network is a wireless local area network WLAN, the second-standard network is a cellular network, and the instruction information includes information used to instruct the second-standard network to broadcast the network information of the first-standard network to the terminal. The sending module 220 is configured to broadcast network information of the WLAN to the terminal.

Optionally, the receiving module 210 is further configured to receive request information that is sent by the terminal to request to access the first-standard network. The sending module 220 is further configured to send the request information to the wireless network control apparatus, so that the wireless network control apparatus determines, according to the network information of the first-standard network and the request information, the instruction information including information about an access point, accessible to the terminal, in the first-standard network.

It should be understood that, in this embodiment of the present invention, the network access point 200 according to this embodiment of the present invention may be corresponding to an entity for performing a method according to an embodiment of the present invention that is described in the following, and the foregoing and other operations and/or functions of the modules in the network access point 200 are respectively used to implement corresponding procedures of methods in FIG. 7 to FIG. 11. For brevity, details are not described herein.

Therefore, the network access point provided in this embodiment of the present invention receives network information that is of a first-standard network and that is sent by a wireless network control apparatus, and may replace the first-standard network to send the network information of the first-standard network to a terminal, so that spectrum resources of networks of multiple standards can be comprehensively used, and cooperation between the networks of multiple standards in terms of sending network information can be implemented.

Figure 5:
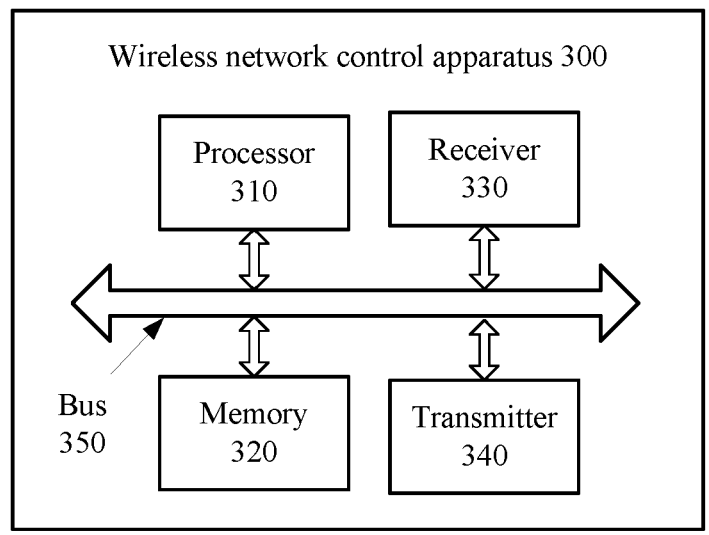
FIG. 5 is a schematic block diagram of a wireless network control apparatus according to another embodiment of the present invention.

FIG. 5 shows a schematic block diagram of a wireless network control apparatus 300 according to another embodiment of the present invention. As shown in FIG. 5, the wireless network control apparatus 300 includes a processor 310, a memory 320, a receiver 330, a transmitter 340, and a bus 350. The processor 310 and the memory 320 are connected by using a bus system 350, the memory 320 is configured to store an instruction, and the processor 310 is configured to execute the instruction stored in the memory 320. The receiver 330 is configured to obtain network information of a first-standard network. The processor 310 is configured to determine instruction information, where the instruction information includes the network information of the first-standard network. The transmitter 340 is configured to send the instruction information to a second-standard network, so that the second-standard network sends the network information of the first-standard network to a terminal, where the terminal works in the second-standard network.

Therefore, the wireless network control apparatus provided in this embodiment of the present invention obtains network information of a first-standard network, and sends the network information of the first-standard network to a terminal by using a second-standard network, so that spectrum resources of networks of multiple standards can be comprehensively used, and cooperation between the networks of multiple standards in terms of sending network information can be implemented.

It should be understood that, in this embodiment of the present invention, the processor 310 may be a central processing unit (CPU), or the processor 310 may be another general-purpose processor, a digital signal processor (DSP), an application-specific integrated circuit (ASIC), a field programmable gate array (FPGA), another programmable logic device, a discrete gate or transistor logic device, a discrete hardware assembly, or the like. The general-purpose processor may be a microprocessor, or the processor may be any conventional processor or the like.

The memory 320 may include a read-only memory and a random access memory, and provide an instruction and data to the processor 310. A part of the memory 320 may further include a non-volatile random access memory. For example, the memory 320 may further store information about a device type.

In addition to a data bus, the bus system 350 may further include a power bus, a control bus, a status signal bus, and the like. However, for clarity of description, various buses are marked as the bus system 350 in the figure.

In an implementation process, steps in the following method may be completed by using an integrated logic circuit of hardware in the processor 310 or an instruction in a form of software. The steps of the method disclosed with reference to the embodiments of the present invention may be directly performed by a hardware processor, or may be performed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 320. The processor 310 reads information in the memory 320, and completes the steps of the following method in combination with hardware of the processor 310. To avoid repetition, details are not described herein.

Optionally, in an embodiment, the instruction information is used to instruct the second-standard network to broadcast the network information of the first-standard network to the terminal. The transmitter 340 is further configured to send another piece of instruction information to the first-standard network, where the another piece of instruction information is used to instruct an access point in the first-standard network to stop broadcasting the network information of the first-standard network, or is used to instruct an access point in the first-standard network to broadcast the network information of the first-standard network by using a short management frame.

Optionally, in an embodiment, the first-standard network is a wireless local area network WLAN, and the second-standard network is a cellular network.

Optionally, in an embodiment, the network information of the first-standard network includes information about an access point in the first-standard network, and before the network information of the first-standard network is obtained, the receiver 330 is configured to receive request information that is sent by the second-standard network and that is used by the terminal to request to access the first-standard network. The processor 310 is further configured to determine, according to the network information of the first-standard network and the request information, the instruction information including information about an access point, accessible to the terminal, in the first-standard network.

Optionally, in an embodiment, the request information further includes an identifier used to indicate a first location of the terminal. The processor 310 is further configured to determine the first location of the terminal according to the identifier, determine a second location of the access point in the first-standard network, and determine, according to the first location, the second location, the network information of the first-standard network, and the request information, the instruction information including the information about the access point, accessible to the terminal, in the first-standard network.

Optionally, in an embodiment, the network information includes at least one type of the following: information about a currently used channel, transmit power information, access point information, user quantity information, load status information, congestion degree information, and quality of service QoS information of different types of services.

It should be further understood that, in this embodiment of the present invention, the wireless network control apparatus 300 according to this embodiment of the present invention may be corresponding to an entity for performing a method according to an embodiment of the present invention that is described in the following, and may also be corresponding to a wireless network control apparatus 100, and the foregoing and other operations and/or functions of the modules in the wireless network control apparatus 300 are respectively used to implement corresponding procedures of methods in FIG. 7 to FIG. 11. For brevity, details are not described herein.

Therefore, the wireless network control apparatus provided in this embodiment of the present invention obtains network information of a first-standard network, and sends the network information of the first-standard network to a terminal by using a second-standard network, so that spectrum resources of networks of multiple standards can be comprehensively used, and cooperation between the networks of multiple standards in terms of sending network information can be implemented.

Figure 6:
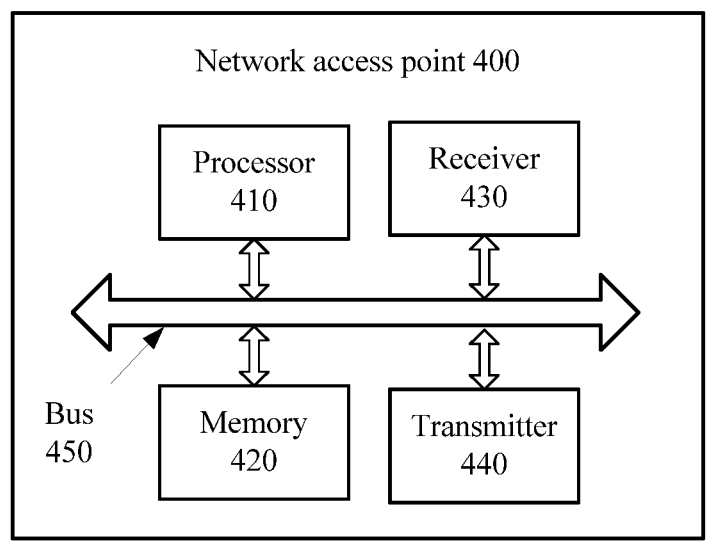
FIG. 6 is a schematic block diagram of a network access point according to another embodiment of the present invention.

FIG. 6 shows a schematic block diagram of a network access point 400 according to another embodiment of the present invention. As shown in FIG. 6, the network access point 400 includes a processor 410, a memory 420, a receiver 430, a transmitter 440, and a bus 450. The processor 410 and the memory 420 are connected by using a bus system 450, the memory 420 is configured to store an instruction, and the processor 410 is configured to execute the instruction stored in the memory 420. The receiver 430 is configured to receive instruction information determined by a wireless network control apparatus, where the instruction information includes network information of a first-standard network. The transmitter 440 is configured to send the network information of the first-standard network to a terminal, where the terminal works in the second-standard network.

Therefore, the network access point provided in this embodiment of the present invention receives network information that is of a first-standard network and that is sent by a wireless network control apparatus, and may replace the first-standard network to send the network information of the first-standard network to a terminal, so that spectrum resources of networks of multiple standards can be comprehensively used, and cooperation between the networks of multiple standards in terms of sending network information can be implemented.

It should be understood that, in this embodiment of the present invention, the processor 410 may be a central processing unit (CPU), or the processor 410 may be another general-purpose processor, a digital signal processor (DSP), an application-specific integrated circuit (ASIC), a field programmable gate array (FPGA), another programmable logic device, a discrete gate or transistor logic device, a discrete hardware assembly, or the like. The general-purpose processor may be a microprocessor, or the processor may be any conventional processor or the like.

The memory 420 may include a read-only memory and a random access memory, and provide an instruction and data to the processor 410. A part of the memory 420 may further include a non-volatile random access memory. For example, the memory 420 may further store information about a device type.

In addition to a data bus, the bus system 450 may further include a power bus, a control bus, a status signal bus, and the like. However, for clarity of description, various buses are marked as the bus system 450 in the figure.

In an implementation process, steps in the following method may be completed by using an integrated logic circuit of hardware in the processor 410 or an instruction in a form of software. The steps of the method disclosed with reference to the embodiments of the present invention may be directly performed by a hardware processor, or may be performed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 420. The processor 410 reads information in the memory 420, and completes the steps of the following method in combination with hardware of the processor 410. To avoid repetition, details are not described herein.

Optionally, in an embodiment, the first-standard network is a wireless local area network WLAN, the second-standard network is a cellular network, and the instruction information includes information used to instruct the second-standard network to broadcast the network information of the first-standard network to the terminal; and the transmitter 440 is configured to: broadcast network information of the WLAN to the terminal.

Optionally, in an embodiment, the first-standard network is a wireless local area network WLAN, and the second-standard network is a cellular network.

Optionally, in an embodiment, the receiver 430 is configured to: receive request information that is sent by the terminal to request to access the first-standard network; and the transmitter 440 is configured to: send the request information to the wireless network control apparatus, so that the wireless network control apparatus determines, according to the network information of the first-standard network and the request information, the instruction information including information about an access point, accessible to the terminal, in the first-standard network.

It should be understood that, in this embodiment of the present invention, the network access point 400 according to this embodiment of the present invention may be corresponding to an entity for performing a method according to an embodiment of the present invention that is described in the following, and may also be corresponding to a network access point 200, and the foregoing and other operations and/or functions of the modules in the network access point 400 are respectively used to implement corresponding procedures of methods in FIG. 7 to FIG. 11. For brevity, details are not described herein.

Therefore, the network access point provided in this embodiment of the present invention receives network information that is of a first-standard network and that is sent by a wireless network control apparatus, and may replace the first-standard network to send the network information of the first-standard network to a terminal, so that spectrum resources of networks of multiple standards can be comprehensively used, and cooperation between the networks of multiple standards in terms of sending network information can be implemented.

Figure 7:
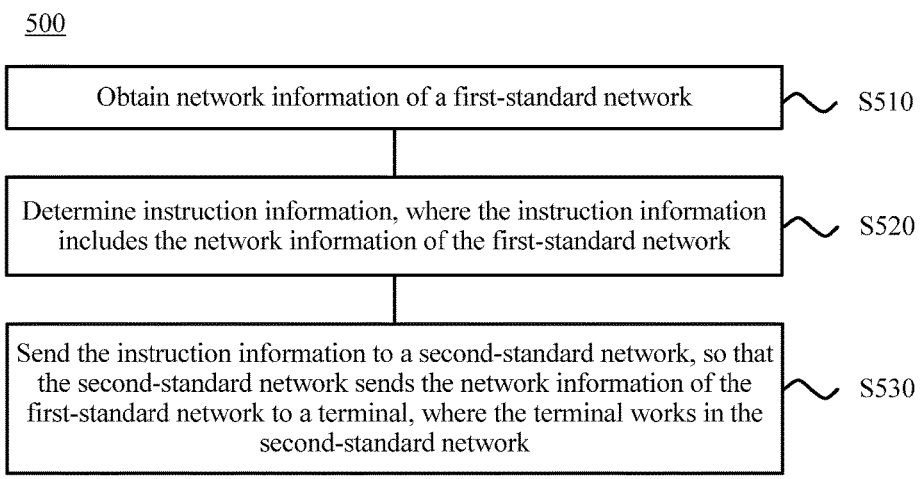
FIG. 7 is a schematic flowchart of an information transmission method according to an embodiment of the present invention.

FIG. 7 shows an information transmission method 500 according to an embodiment of the present invention. The method 500 may be performed by a wireless network control apparatus or a wireless network control unit, and the method 500 includes:

S510. Obtain network information of a first-standard network.

The wireless network control apparatus may obtain network information of networks of multiple standards. For example, the wireless network control apparatus sends a request for collecting network information to access points in networks of different standards, to require the networks of different standards to report network information of the networks of different standards; or access points in networks of different standards periodically report network information to the wireless network control apparatus according to presetting, which is not limited in this embodiment of the present invention. The network information may be sent to the wireless network control apparatus by using an access point in a network, or may be sent to the wireless network control apparatus by another access device or control device in a network, which is not limited in this embodiment of the present invention.

It should be understood that the network information obtained by the wireless network control apparatus may include at least one type of the following information of the networks of different standards: information about a currently used channel, transmit power information, access point information, user quantity information, load status information, congestion degree information, and quality of service QoS information of different types of services, which is not limited in this embodiment of the present invention.

S520. Determine instruction information, where the instruction information includes the network information of the first-standard network.

Specifically, after obtaining the network information of the first-standard network, the wireless network control apparatus may make a comprehensive decision according to network statuses and terminal statuses that are of the current networks of different standards, and determine the instruction information for a second-standard network. The instruction information is used to instruct the second-standard network to perform processing related to the first-standard network, and includes the network information of the first-standard network. That is, the wireless network control apparatus makes a decision related to the first-standard network, and the second-standard network assists in delivering related information of the first-standard network in the decision to the terminal. Making the comprehensive decision means that the decision is a decision made by taking network statuses of the first-standard network and the second-standard network into consideration and with reference to statuses of multiple terminals in the networks of the two standards. In a specific example, currently, there are two access points in the cellular network and three access points in the WLAN, and four terminals access the access points in the foregoing cellular network and five terminals access the access points in the foregoing WLAN. The wireless network control apparatus obtains network information of the cellular network and the WLAN, and makes a comprehensive decision with reference to statuses of the current several terminals. For example, the decision may be as follows: Two of the four terminals that access the cellular network are handed over to the WLAN, and access the WLAN by using an access point in the WLAN.

It should be noted that a relationship between an access point in the first-standard network and an access point in the second-standard network may be obtained according to heterogeneous information. For example, the heterogeneous information may include information indicating an access point in the first-standard network and an access point in the second-standard network that constitute a heterogeneous access network, and the like. The heterogeneous information may be stored in the wireless network control apparatus, or may be stored in a third-party network element that can be obtained by using the wireless network control apparatus, which is not limited in this embodiment of the present invention. In addition, this embodiment of the present invention may further be similarly applied to two or more networks of a same standard. For example, this embodiment of the present invention may further be applied to two different networks of a cellular network.

S530. Send the instruction information to a second-standard network, so that the second-standard network sends the network information of the first-standard network to a terminal.

After making the decision related to the first-standard network, the wireless network control apparatus needs to notify the terminal, so that the terminal performs related processing. For example, the terminal selects a proper access point to access a network, or to perform network handover, or the like.

It should be understood that the terminal in this embodiment of the present invention currently works at least in the second-standard network, so that information about the access point in the first-standard network may be sent by using the access point in the second-standard network. That is, if the terminal currently works only in the second-standard network, information may be sent to the terminal by using a resource corresponding to the second-standard network; if the terminal currently works in networks of multiple standards such as a cellular network, a WLAN, and Bluetooth, instruction information that is related to the WLAN and that is determined by the wireless network control apparatus may be sent to the terminal by using the cellular network or the Bluetooth, so that load of the WLAN may be relieved.

Therefore, in the information transmission method provided in this embodiment of the present invention, network information of a first-standard network is obtained and the network information of the first-standard network is sent to a terminal by using a second-standard network, so that spectrum resources of networks of multiple standards can be comprehensively used, and cooperation between the networks of multiple standards in terms of sending network information can be implemented.

Optionally, in an embodiment, the instruction information is used to instruct the second-standard network to broadcast the network information of the first-standard network to the terminal. The method 500 further includes sending another piece of instruction information to the first-standard network, where the another piece of instruction information is used to instruct an access point in the first-standard network to stop broadcasting the network information of the first-standard network, or is used to instruct an access point in the first-standard network to broadcast the network information of the first-standard network by using a short management frame.

Specifically, the access point in the first-standard network always needs to periodically or aperiodically broadcast the network information of the first-standard network to the terminal; therefore, load of a MAC layer of the first-standard network is heavy. The network information that is of the first-standard network and that is obtained by the wireless network control apparatus is information about a currently used channel, transmit power information, access point information, user quantity information, load status information, congestion degree information, quality of service QoS information of different types of services, or the like. These pieces of information of the first-standard network are sent to a corresponding terminal in a broadcasting or unicasting manner by using the second-standard network, so that the first-standard network sends the network information less frequently, efficiency of the MAC layer of the first-standard network can be improved, and resources of networks of multiple standards supported by the terminal can be more fully used.

For example, the first-standard network is a WLAN, and the second-standard network is a cellular network. The cellular network broadcasts, to the terminal according to an instruction of the wireless network control apparatus, network information of the WLAN with which the cellular network constitutes a heterogeneous network. In addition, the wireless network control apparatus sends another piece of instruction information to the WLAN. The another piece of instruction information is used to instruct an access point in the WLAN to stop broadcasting the network information of the WLAN, or is used to instruct an access point in the WLAN to broadcast the network information of the WLAN by using a short management frame. In the WLAN, a beacon frame beacon is generally used for broadcasting. In this embodiment of the present invention, the network information of the WLAN is broadcasted or unicasted by using the cellular network; therefore, broadcasting a beacon in the WLAN may be cancelled or a beacon may be broadcasted less frequently; or a common beacon is changed into a short beacon during broadcasting.

Figure 8:
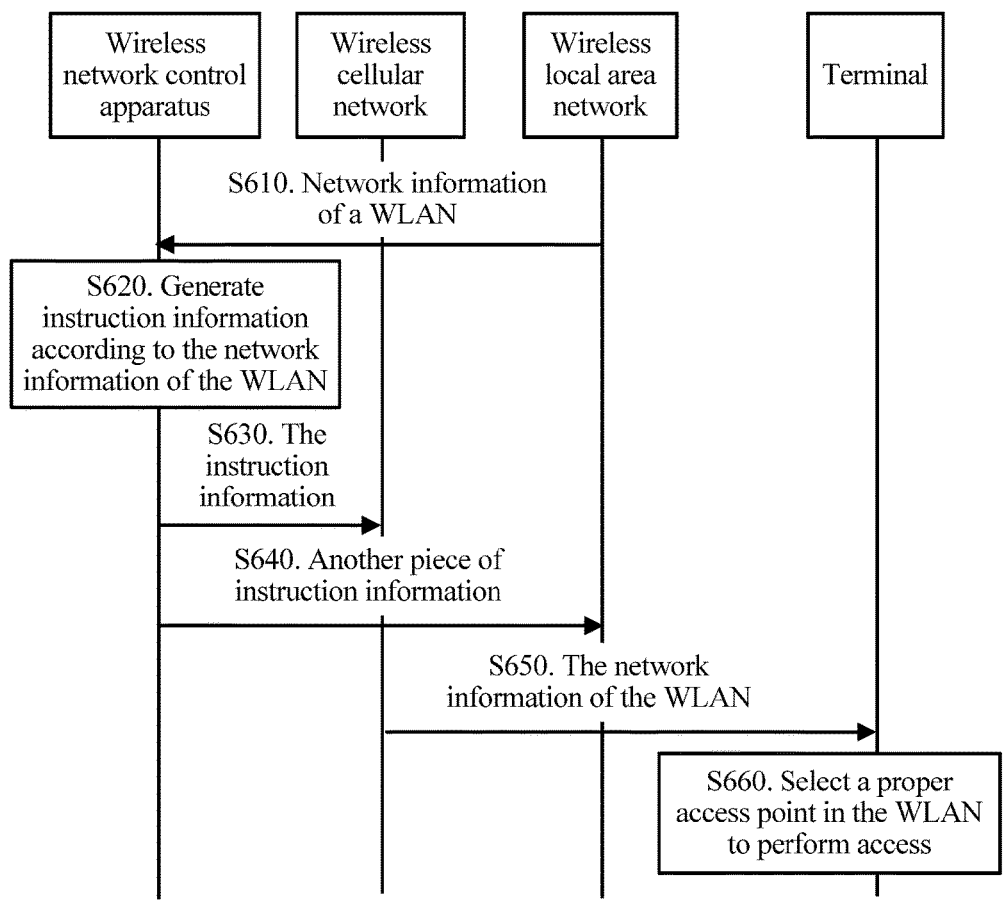
FIG. 8 is a schematic flowchart of an information transmission method according to another embodiment of the present invention.

In an example of the following description, the first-standard network is a WLAN and the second-standard network is a cellular network, and an information transmission method 600 is described in detail. FIG. 8 is a schematic diagram of the information transmission method 600 according to an embodiment of the present invention.

S610. A wireless network control apparatus obtains network information of a WLAN, including information about a currently used channel, transmit power information, access point information, user quantity information, load status information, congestion degree information, quality of service QoS information of different types of services, and the like.

S620. The wireless network control apparatus generates instruction information according to the network information of the WLAN. The instruction information is used to instruct a cellular network to broadcast the network information of the WLAN.

S630. The wireless network control apparatus sends the generated instruction information to a cellular network.

S640. The wireless network control apparatus sends another piece of instruction information to the WLAN, to instruct an access point in the WLAN to stop broadcasting, reduce a broadcast frequency, or broadcast the network information of the WLAN by using a short beacon.

S650. The cellular network broadcasts the network information of the WLAN to the terminal according to the instruction information sent by the wireless network control apparatus.

S660. The terminal selects, according to the network information of the WLAN that is broadcasted by the cellular network, a proper access point in the WLAN to perform access.

It should be understood that, in an example of this embodiment of the present invention, the first-standard network is a WLAN and the second-standard network is a cellular network, which is not intended to limit this embodiment of the present invention. The WLAN may also assist the cellular network in sending network information of the cellular network to the terminal. The first-standard network and the second-standard network may also be networks of other standards, which is not limited in this embodiment of the present invention.

Therefore, in the information transmission method provided in this embodiment of the present invention, in a heterogeneous access network in which WLANs are densely deployed, network information of the WLAN is broadcasted or unicasted by using a cellular network, so that fewer beacons of the WLAN can be sent, and efficiency of a MAC layer of the WLAN can be improved.

Optionally, in an embodiment, the network information of the first-standard network includes information about an access point in the first-standard network, and before the obtaining network information of the first-standard network, the method 500 further includes receiving request information that is sent by the second-standard network and that is used by the terminal to request to access the first-standard network. The determining instruction information in S520 includes determining, according to the network information of the first-standard network and the request information, the instruction information including information about an access point, accessible to the terminal, in the first-standard network.

Specifically, the terminal that supports multiple standards preliminarily determines a network status according to a current running status of the terminal such as a type of a currently processed service, QoS requirements of services of different types, or a network speed of a current communications standard. For example, if the terminal is currently in the second-standard network, and the terminal determines that the terminal needs to access the first-standard network, the terminal sends, to the wireless network control apparatus by using the second-standard network, request information used to request to access the first-standard network.

The wireless network control apparatus obtains the network information of the first-standard network, and makes a comprehensive decision according to the request information that is sent by the second-standard network and that is used by the terminal to request to access the first-standard network, and determines that the terminal accesses an access point in the first-standard network. The wireless network control apparatus adds an identifier of the terminal and the information used to indicate the access point, accessible to the terminal, in the first-standard network into the instruction information, and sends the instruction information to the second-standard network. The access point in the second-standard network sends, to the terminal, and sends the instruction information to the second-standard network. The information that indicates the access point, accessible to the terminal, in the first-standard network may be a list of access points in the first-standard network that are accessible to the terminal, which is not limited in this embodiment of the present invention.

Optionally, the request information may further include an identifier used to indicate a first location of the terminal, and the determining, according to the network information of the first-standard network and the request information, the instruction information including information about an access point, accessible to the terminal, in the first-standard network includes determining the first location of the terminal according to the identifier; determining a second location of the access point in the first-standard network; and determining, according to the first location, the second location, the network information of the first-standard network, and the request information, the instruction information including the information about the access point, accessible to the terminal, in the first-standard network.

Specifically, the wireless network control apparatus may further determine the access point, accessible to the terminal, in the first-standard network with reference to locations of the terminal and the access point in the first-standard network. For example, an access point that is in the first-standard network and whose distance from the terminal is within a threshold range may be determined as the access point that is in the instruction information, is in the first-standard network, and is accessible to the terminal. The locations of the terminal and the access point in the first-standard network are taken into consideration, so that a decision that is made by the wireless network control apparatus and related to the access point, accessible to the terminal, in the first-standard network is more accurate.

The wireless network control apparatus may determine the first location of the terminal according to the identifier included in the request information. The wireless network control apparatus may determine the second location of the access point in the first-standard network by using a global positioning system (GPS) or by using a technical means such as indoor positioning, which is not limited in this embodiment of the present invention. In addition, location information of the access point in the first-standard network may be determined not by the wireless network control apparatus but by another positioning device, and after positioning, the access point or the positioning device reports the location information of the access point to the wireless network control apparatus.

Figure 9:
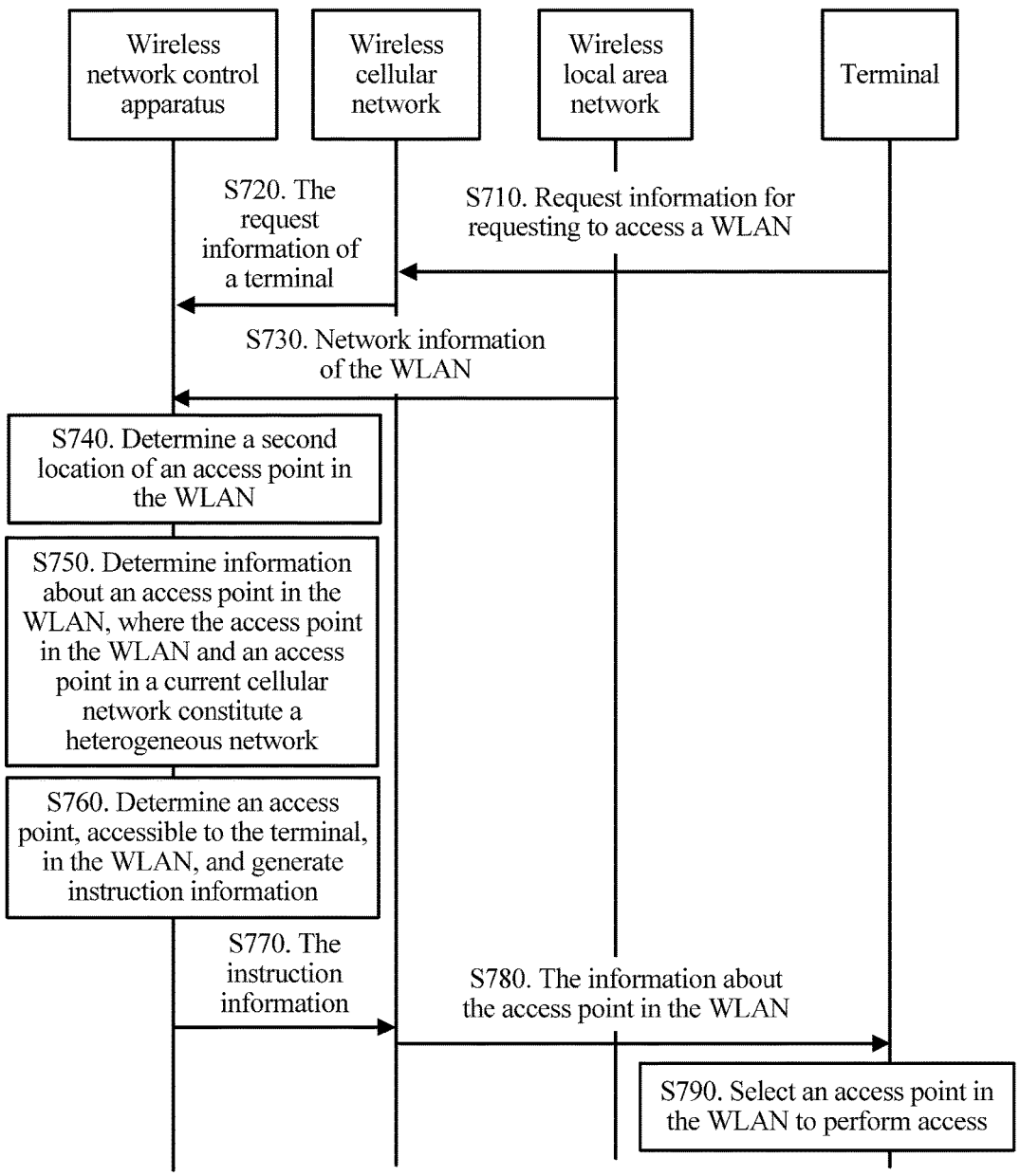
FIG. 9 is a schematic flowchart of an information transmission method according to another embodiment of the present invention.

In an example of the following description, the first-standard network is a WLAN and the second-standard network is a cellular network, and an information transmission method 700 is described in detail. FIG. 9 is a schematic diagram of an information transmission method according to an embodiment of the present invention.

S710. A terminal sends request information for requesting to access a WLAN to a cellular network. The request information includes user information such as a terminal ID and an identifier used to indicate a first location of the terminal. The location of the terminal can be determined by using a GPS, or may also be obtained by using an indoor positioning method or another technical means such as Wi-Fi positioning.

S720. The cellular network sends the foregoing request information of the terminal to the wireless network control apparatus.

S730. The wireless network control apparatus receives network information of the WLAN, where the network information of the WLAN includes information related to a network status of the WLAN such as information about an access point in the WLAN, a user quantity, a load status, or a congestion degree.

S740. The wireless network control apparatus determines a second location of an access point in the WLAN. For example, the second location may be determined by using a GPS, or may be obtained by using an indoor positioning technology, which is not limited in this embodiment of the present invention. In addition, the wireless network control apparatus may determine a second location of one access point in the WLAN, or may determine second locations separately corresponding to multiple access points in the WLAN.

S750. The wireless network control apparatus determines information about an access point in the WLAN, where the access point in the WLAN and an access point in the current cellular network constitute a heterogeneous network. Related information of the heterogeneous network including the access point in the cellular network and the access point in the WLAN may be stored in the wireless network control apparatus, or may be stored in a third-party network element that can be obtained by the wireless network control apparatus, which is not limited in this embodiment of the present invention.

S760. The wireless network control apparatus determines, according to the first location of the terminal, the second location of the access point in the WLAN, the network information of the WLAN, and the request information, information about an access point, accessible to the terminal, in the WLAN, and determines the information about the access point, accessible to the terminal, in the WLAN as a part of the instruction information. If the wireless network control apparatus determines that there is no accessible access point in the WLAN, instruction information indicating that there is no accessible access point in the WLAN is generated.

S770. The wireless network control apparatus sends the generated instruction information to the cellular network.

S780. The access point in the cellular network sends the information that is about the access point, accessible to the terminal, in the WLAN and that is in the instruction information received from the wireless network control apparatus to the terminal that requests to access the WLAN.

S790. The terminal selects a proper access point from the accessible access point in the WLAN according to the information about the access point in the WLAN to perform access.

It should be understood that, in the example of the foregoing description, the first-standard network is a WLAN and the second-standard network is a cellular network, which is not intended to limit this embodiment of the present invention. The first-standard network and the second-standard network may be networks of a same communications standard, or may be any two of a cellular network, a WLAN, a WiMAX network, Bluetooth, infrared, or a future 5G network. This embodiment of the present invention is further applicable to networks of more than two communications standards. A method for controlling the networks together by the wireless network control apparatus is similar to this embodiment, and details are not described herein.

Therefore, in the information transmission method provided in this embodiment of the present invention, when load of a network of a particular standard is heavy, a terminal requests to access or be handed over to a network of another standard, and a wireless network control apparatus communicates with the terminal by using the currently working network, and sends network information of the network of another standard, so that spectrum resources of networks of multiple standards can be comprehensively used, and cooperation between the networks of multiple standards in terms of sending network information can be implemented.

Optionally, in another embodiment, access to the first-standard network by the terminal is not determined and initiated by the terminal, but is actively initiated by the wireless network control apparatus. Correspondingly, the network information of the first-standard network includes information about an access point in the first-standard network, and before the determining instruction information, the method 500 further includes: obtaining network information of the second-standard network; and the determining instruction information includes: determining, according to the network information of the first-standard network and the network information of the second-standard network, the instruction information including the information about the access point in the first-standard network, where the access point in the first-standard network is an access point that is in the first-standard network to which the terminal can be handed over from the second-standard network.

Specifically, the wireless network control apparatus obtains the respective network information of the first-standard network and the second-standard network, especially respective load statuses, user quantities, QoS of different types of users, and the like of the first-standard network and the second-standard network, and certainly, the information about the access point in the first-standard network is included. The wireless network control apparatus determines, according to the respective network information of the first-standard network and the second-standard network, a terminal in the second-standard network that is to be handed over to the first-standard network. The wireless network control apparatus sends, to the second-standard network, the instruction information including the information about the access point that is in the first-standard network to which the terminal may be handed over from the second-standard network, and sends the information about the access point in the first-standard network to the corresponding terminal by using the second-standard network.

Optionally, the instruction information may further include handover time information, to instruct to hand over the terminal to the first-standard network before a specified time, and the second-standard network also sends the handover time information to the terminal.

Figure 10:
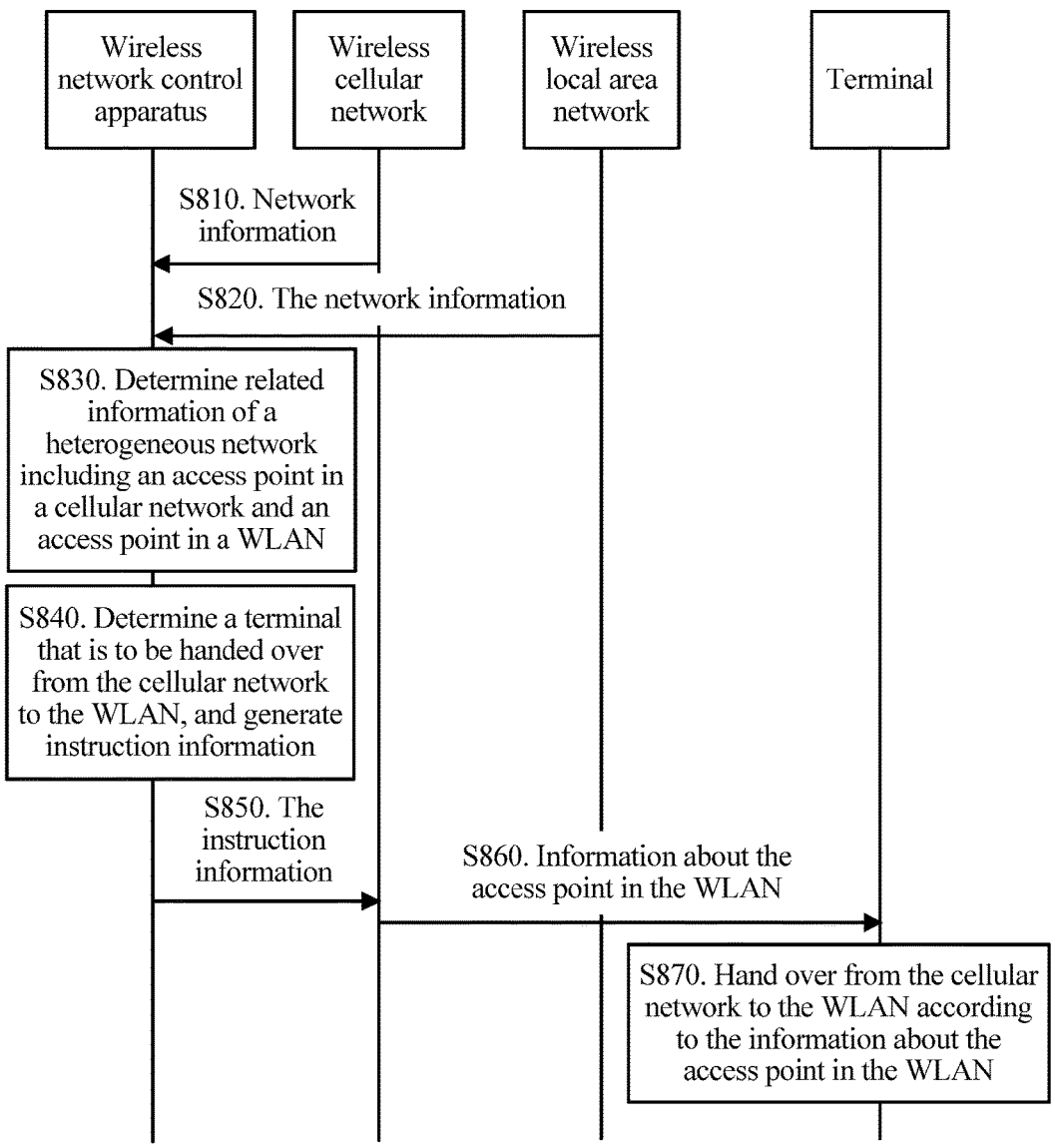
FIG. 10 is a schematic flowchart of an information transmission method according to another embodiment of the present invention.

In an example of the following description, the first-standard network is a WLAN and the second-standard network is a cellular network, and an information transmission method 800 is described in detail. FIG. 10 is a schematic diagram of an information transmission method according to another embodiment of the present invention.

In S810 and S820, a wireless network control apparatus obtains respective network information of a WLAN and a cellular network, including obtaining load statuses, user quantities, QoS of different types of users, and the like of the WLAN and the cellular network, and information about an access point in the WLAN.

S830. The wireless network control apparatus determines related information of a heterogeneous network including an access point in the cellular network and an access point in the WLAN.

S840. The wireless network control apparatus determines network statuses of the WLAN and the cellular network, and if the current heterogeneous network has a relatively large quantity of cellular network users and relatively heavy load, the wireless network control apparatus may determine to hand over some cellular network users to the WLAN, and generate corresponding instruction information. For example, a user of an application type, a user with a low QoS requirement, or a user with an economical contract is handed over from the cellular network to the WLAN.

S850. The wireless network control apparatus sends the generated instruction information to the cellular network, where the instruction information includes handover time information and the information about the access point that are of the WLAN.

S860. The access point in the cellular network sends the handover time information and the information about the access point that are of the WLAN to a corresponding terminal.

S870. The terminal is handed over from the cellular network to the WLAN according to the handover time information and the information about the access point that are of the WLAN.

It should be understood that, in an example of this embodiment of the present invention, a terminal is handed over from a cellular network to a WLAN, so that load sharing for the cellular network can be implemented, and resources of networks of different communications standards in a heterogeneous network are balanced. The wireless network control apparatus may further hand over the terminal from the WLAN to the cellular network according to the network information of the two communications standards, to improve QoS of some users and the like. The heterogeneous network may further include networks of more than two communications standards. A method for controlling the networks together by the wireless network control apparatus is similar to this embodiment, and details are not described herein.

Therefore, in the information transmission method provided in this embodiment of the present invention, when load of a network of a particular standard is heavy, a wireless network control apparatus hands over a terminal to a network of another standard, communicates with the terminal by using the currently working network, and sends network information of the network of another standard, so that spectrum resources of networks of multiple standards can be comprehensively used, and cooperation between the networks of multiple standards in terms of sending network information can be implemented.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 11:
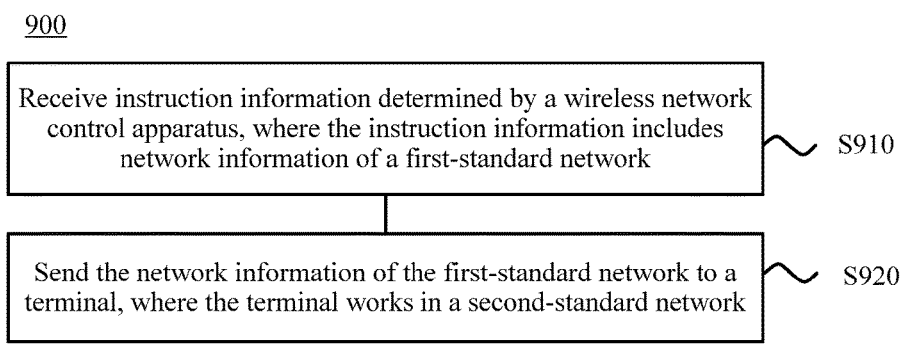
FIG. 11 is a schematic flowchart of an information transmission method according to another embodiment of the present invention.

FIG. 11 shows a schematic flowchart of an information transmission method 900 according to an embodiment of the present invention, where the method 900 may be performed by a second-standard network, and includes:

S910. Receive instruction information determined by a wireless network control apparatus, where the instruction information includes network information of a first-standard network.

S920. Send the network information of the first-standard network to a terminal, where the terminal works in a second-standard network.

Therefore, in the information transmission method provided in this embodiment of the present invention, network information of a first-standard network sent by a wireless network control apparatus is received, and the wireless network control apparatus may replace the first-standard network to send the network information of the first-standard network to a terminal, so that spectrum resources of networks of multiple standards can be comprehensively used, and cooperation between the networks of multiple standards in terms of sending network information can be implemented.

Optionally, in an embodiment, the first-standard network is a wireless local area network WLAN, the second-standard network is a cellular network, and the instruction information includes information used to instruct the second-standard network to broadcast the network information of the first-standard network to the terminal; and the sending the network information of the first-standard network to a terminal includes: broadcasting network information of the WLAN to the terminal.

Optionally, in another embodiment, the method 900 further includes: receiving request information that is sent by the terminal to request to access the first-standard network; and sending the request information to the wireless network control apparatus, so that the wireless network control apparatus determines, according to the network information of the first-standard network and the request information, the instruction information including information about an access point, accessible to the terminal, in the first-standard network.

Therefore, in the information transmission method provided in this embodiment of the present invention, network information of a first-standard network sent by a wireless network control apparatus is received, and the wireless network control apparatus may replace the first-standard network to send the network information of the first-standard network to a terminal, so that spectrum resources of networks of multiple standards can be comprehensively used, and cooperation between the networks of multiple standards in terms of sending network information can be implemented.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless network control apparatus, comprising:
a processor; and
a non-transitory computer-readable storage medium coupled to the processor and storing a program for execution by the processor, the program including instructions to:
obtain a network information of a first-standard network;
determine a first instruction information, wherein the first instruction information instructs a second-standard network to broadcast the network information of the first-standard network to a terminal, and wherein the first instruction information comprises the network information that is of the first-standard network; and
send the first instruction information to the second-standard network, wherein the first instruction information causes the second-standard network to broadcast the network information of the first-standard network to the terminal, wherein the terminal works in the second-standard network, wherein the program further includes instructions to send a second instruction information to the first-standard network, wherein the second instruction information instructs an access point in the first-standard network to stop broadcasting the network information of the first-standard network, or instructs the access point in the first-standard network to broadcast the network information of the first-standard network by using a short management frame.

2. The apparatus according to claim 1, wherein the first-standard network is a wireless local area network (WLAN), and the second-standard network is a cellular network.

3. The apparatus according to claim 1, wherein the network information of the first-standard network comprises information about the access point in the first-standard network;
wherein the program further includes instructions to receive, before obtaining the network information of the first-standard network, request information that is sent by the second-standard network and that is used by the terminal to request to access the first-standard network; and
wherein the program further includes instructions to determine, according to the network information of the first-standard network and the request information, the first instruction information comprising information about the access point, accessible to the terminal, in the first-standard network.

4. The apparatus according to claim 3, wherein the request information further comprises an identifier used to indicate a first location of the terminal; and
wherein the program further includes instructions to:
determine the first location of the terminal according to the identifier;
determine a second location of the access point in the first-standard network; and
determine, according to the first location, the second location, the network information of the first-standard network, and the request information, the first instruction information comprising the information about the access point, accessible to the terminal, in the first-standard network.

5. The apparatus according to claim 1, wherein the network information of the first-standard network comprises information about the access point in the first-standard network;
wherein the program further includes instructions to obtain network information of the second-standard network before the first instruction information is determined; and
wherein the program further includes instructions to determine, according to the network information of the first-standard network and the network information of the second-standard network, the first instruction information comprising the information about the access point in the first-standard network, wherein the access point in the first-standard network is an access point that is in the first-standard network to which the terminal can be handed over from the second-standard network.

6. The apparatus according to claim 1, wherein the network information comprises at least one of information about a currently used channel, transmit power information, access point information, user quantity information, load status information, congestion degree information, and quality of service (QoS) information of different types of services.

7. An information transmission method performed by a wireless network control apparatus, the method comprising:
obtaining a network information of a first-standard network;
determining a first instruction information that instructs a second-standard network to broadcast the network information of the first-standard network to a terminal, wherein the first instruction information comprises the network information of the first-standard network; and
sending the first instruction information to the second-standard network, the first instruction information causing the second-standard network to broadcast the network information of the first-standard network to the terminal, wherein the terminal works in the second-standard network; and
sending a second instruction information to the first-standard network, wherein the second instruction information instructs an access point in the first-standard network to stop broadcasting the network information of the first-standard network, or instructs the access point in the first-standard network to broadcast the network information of the first-standard network by using a short management frame.

8. The method according to claim 7, wherein the first-standard network is a wireless local area network WLAN, and the second-standard network is a cellular network.

9. The method according to claim 7, wherein the network information of the first-standard network comprises information about an access point in the first-standard network;
wherein the method further comprises receiving, before the obtaining the network information of the first-standard network, a request information that is sent by the second-standard network and that is used by the terminal to request to access the first-standard network; and wherein the determining the first instruction information comprises determining, according to the network information of the first-standard network and the request information, the first instruction information comprising information about an access point, accessible to the terminal, in the first-standard network.

10. The method according to claim 9, wherein the request information further comprises an identifier used to indicate a first location of the terminal; and wherein the determining, according to the network information of the first-standard network and the request information, the first instruction information comprising information about an access point, accessible to the terminal, in the first-standard network comprises:

determining the first location of the terminal according to the identifier;

determining a second location of the access point in the first-standard network; and determining, according to the first location, the second location, the network information of the first-standard network, and the request information, the first instruction information comprising the information about the access point, accessible to the terminal, in the first-standard network.

11. The method according to claim 7, wherein the network information of the first-standard network comprises information about the access point in the first-standard network;

wherein the method further comprises obtaining a network information of the second-standard network before the determining the first instruction information; and wherein the determining the first instruction information comprises determining, according to the network information of the first-standard network and the network information of the second-standard network, the first instruction information comprising the information about the access point in the first-standard network, wherein the access point in the first-standard network is an access point that is in the first-standard network to which the terminal can be handed over from the second-standard network.

12. The method according to claim 7, wherein the network information comprises at least one of information about a currently used channel, transmit power information, access point information, user quantity information, load status information, congestion degree information, and quality of service (QoS) information of different types of services.

* * * * *